(12) United States Patent
Jang et al.

(10) Patent No.: US 11,025,880 B2
(45) Date of Patent: Jun. 1, 2021

(54) ROI-BASED VR CONTENT STREAMING SERVER AND METHOD

(71) Applicant: KOREA ELECTRONICS TECHNOLOGY INSTITUTE, Seongnam-si (KR)

(72) Inventors: Junhwan Jang, Goyang-si (KR); Woochool Park, Incheon (KR); Youngwha Kim, Seoul (KR); Jinwook Yang, Goyang-si (KR); Sangpil Yoon, Seoul (KR); Hyunwook Kim, Goyang-si (KR); Eunkyung Cho, Gyeonggi-do (KR); Minsu Choi, Seoul (KR); Junsuk Lee, Seoul (KR); Jaeyoung Yang, Seoul (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 0 days.

(21) Appl. No.: 16/713,797

(22) Filed: Dec. 13, 2019

(65) Prior Publication Data

US 2020/0145636 A1 May 7, 2020

Related U.S. Application Data

(63) Continuation of application No. PCT/KR2018/014572, filed on Nov. 23, 2018.

(30) Foreign Application Priority Data

Nov. 5, 2018 (KR) .................. 10-2018-0134700

(51) Int. Cl.
*H04N 13/117* (2018.01)
*H04N 13/194* (2018.01)
(Continued)

(52) U.S. Cl.
CPC .......... *H04N 13/117* (2018.05); *H04L 65/601* (2013.01); *H04L 65/607* (2013.01); *H04N 13/194* (2018.05); *H04N 2013/0092* (2013.01)

(58) Field of Classification Search
CPC . H04L 65/601; H04L 65/607; H04L 65/4084; H04L 65/4092; H04L 65/602;
(Continued)

(56) References Cited

U.S. PATENT DOCUMENTS

2019/0043201 A1* 2/2019 Strong ............... G06K 9/00624

FOREIGN PATENT DOCUMENTS

JP 2004-147281 A 5/2004
KR 10-2012-0094273 A 8/2012
(Continued)

OTHER PUBLICATIONS

Kim et al., "Implementation of 360 VR Tiled Video Player with Eye Tacking based Foveated Rendering", Journal of Korea Multimedia Society, vol. 21, No. 7—9 pages (Jul. 2018).
(Continued)

*Primary Examiner* — Patricia I Young
(74) *Attorney, Agent, or Firm* — Knobbe Martens Olson & Bear LLP

(57) ABSTRACT

A region of interest (ROI)-based virtual reality (VR) content streaming server and a method are disclosed. The streaming server includes a communication unit that receives a request signal for a media presentation description (MPD) file regarding tiles of a tiled video, ROI) information, and a request signal for a segment file from an electronic device, and transmits the MPD file and the segment file corresponding to the request signal to the electronic device. The streaming server further includes a controller configured to, when the request signal for the MPD file is received, control the MPD file corresponding to the request signal to be transmitted to the electronic device.

10 Claims, 7 Drawing Sheets

(51) Int. Cl.
    *H04N 13/344*     (2018.01)
    *H04N 21/23*     (2011.01)
    *H04N 21/47*     (2011.01)
    *H04L 29/06*     (2006.01)
    *H04N 13/00*     (2018.01)

(58) Field of Classification Search
    CPC .... H04L 65/80; H04N 13/117; H04N 13/194; H04N 13/0092; H04N 13/334; H04N 21/23106; H04N 21/2342; H04N 21/23614; H04N 21/2393; H04N 21/4728
    USPC .......................................................... 348/43
    See application file for complete search history.

(56) References Cited

FOREIGN PATENT DOCUMENTS

| KR | 10-2016-0106563 A | 9/2016 |
|---|---|---|
| KR | 10-1764317 B2 | 8/2017 |
| KR | 10-2018-0058455 A | 6/2018 |

OTHER PUBLICATIONS

Kim et al., "Implementation of High Quality 360 VR Video Low-latency Live Streaming System using Multi Level Tile Caching based on MPEG DASH SRD", Journal of Korea Multimedia Society, vol. 21, No. 8—11 pages (Aug. 2018).
International Search Report of corresponding PCT Application No. PCT/KR2018/014572—4 pages (dated Aug. 8, 2019).

* cited by examiner

ROI-BASED VR CONTENT STREAMING SERVER AND METHOD

CROSS REFERENCE TO RELATED APPLICATIONS

This is a continuation application of International Patent Application No. PCT/KR2018/014572, filed on Nov. 23, 2018, which claims priority to Korean patent application No. 10-2018-0134700 filed on Nov. 5, 2018, contents of both of which are incorporated herein by reference in their entireties.

BACKGROUND

Technical Field

The present disclosure relates to a virtual reality (VR) content streaming technology and, more particularly, to an ROI-based VR content streaming server and method with a reduced streaming delay time.

Description of Related Technology

With the recent growths of IT technologies, high-quality content transmission has been enabled and the demand for high-quality media content video streaming service is increasing. Thus, researches on various techniques for more efficiently streaming and rendering of high-quality media content more than ultra-high definition (UHD) are being actively conducted.

According to a recently proposed spatial relationship description (SRD), a video is divided into spatial units and encoded by HEVC, and the encoded video is divided again into spatial and time units to generate tiles. Then, bitstream stitching is performed for a tile corresponding to a region of interest (ROI) of a user as a high-quality tile and for the other tiles as low-quality tiles. This can selectively improve the network efficiency and the quality of streaming video.

SUMMARY

When a viewpoint change occurs before final streaming and rendering to a head mounted display (HMD) device, a switching delay may be generated. In order to solve this problem, not only tracking and rendering processing is required at the user device, but also a fast response to the dashing segment is required at the streaming server.

An aspect of the present invention is to provide an ROI-based VR content streaming server and method with a reduced streaming delay time through tile caching of a tiled video using an ROT.

Embodiments of the present invention provide an ROI-based VR content streaming server that includes a communication unit that receives a request signal for a media presentation description (MPD) file regarding tiles of a tiled video, region of interest (ROI) information, and a request signal for a segment file from an electronic device, and transmits the MPD file and the segment file corresponding to the request signals to the electronic device. The server further includes a controller configured to, when the request signal for the MPD file is received, control the MPD file corresponding to the request signal to be transmitted to the electronic device, when the ROI information is received, to generate and cache the segment file in which a first resolution and second to nth resolutions ('n' is a natural number of two or more), which are lower than the first resolution, are assigned to the tiles of the tiled video, respectively, based on the ROI information, and when the request signal for the segment file is received, to control the cached segment file to be transmitted to the electronic device.

In addition, the controller is further configured to predict next ROI information based on the ROI information and thereby to generate the segment file in which the first to nth resolutions are assigned.

In addition, the controller is further configured to, based on a base tile corresponding to the ROI information among the tiles, predict a moving direction of an object contained in the base tile and thereby to predict the next ROI information.

In addition, the controller is further configured to assign the first resolution to a tile corresponding to the ROI among the tiles and to assign the second to nth resolutions to the remaining tiles.

In addition, the controller is further configured to control the cached segment file to be transmitted in real time.

Embodiments of the present invention provide an ROI-based VR content streaming method that includes, at a streaming server, when a request signal for a media presentation description (MPD) file regarding tiles of a tiled video is received from an electronic device, transmitting the MPD file corresponding to the request signal to the electronic device; at the streaming server, when region of interest (ROI) information is received from the electronic device, generating and caching a segment file in which a first resolution and second to nth resolutions, which are lower than the first resolution, are assigned to the tiles of the tiled video, respectively, based on the ROI information; and at the streaming server, when a request signal for the segment file is received from the electronic device, transmitting the cached segment file to the electronic device.

In addition, the caching includes predicting next ROI information based on the ROI information and thereby generating the segment file in which the first to nth resolutions are assigned.

In addition, the caching includes, based on a base tile corresponding to the ROI information among the tiles, predicting a moving direction of an object contained in the base tile and thereby predicting the next ROT information.

In addition, the caching includes assigning the first resolution to a tile corresponding to the ROI among the tiles and assigning the second to nth resolutions to the remaining tiles.

In addition, the cached segment file is transmitted in real time.

The ROI-based VR content streaming server and method according to embodiments of the present invention can cache in advance high-quality and low-quality tiles to be transmitted, by using ROT information of a user, and transmit the cached tiles in response to a transmission request. Therefore, it is possible to reduce a load on transmission request, minimize a response delay time, and thereby reduce a streaming delay time.

DETAILED DESCRIPTION

Figure 1:
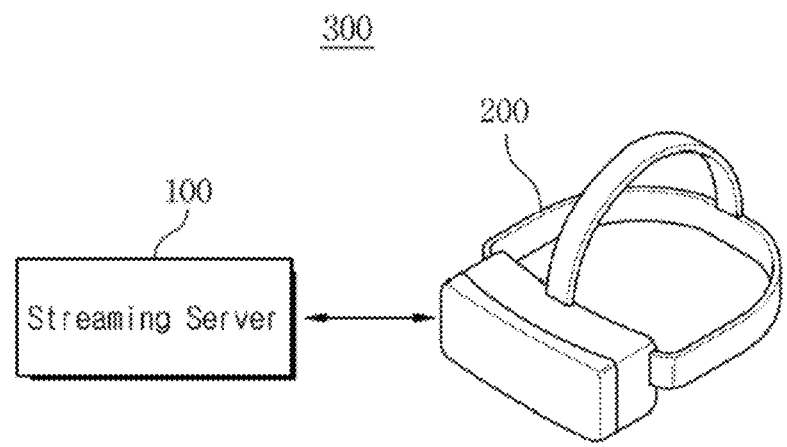
FIG. 1 is a schematic diagram illustrating a VR content streaming system according to an embodiment of the present invention.

Hereinafter, embodiments of the present invention will be described in detail with reference to the accompanying drawings. In the drawings and descriptions, the same or corresponding elements are denoted by the same reference numerals. Also, in describing features of the present invention, techniques that are well known in the art will not be described. This is to avoid obscuring a subject matter of embodiments of the present invention by omitting an unnecessary explanation.

FIG. 1 is a schematic diagram illustrating a VR content streaming system according to an embodiment of the present invention.

Referring to FIG. 1, the VR content streaming system 300 reduces a streaming delay time through tile caching of a tiled video using a region of interest (ROI). The VR content streaming system 300 includes a streaming server 100 and an electronic device 200.

The streaming server 100 generates a media presentation description (MPD) file for tiles of the tiled video and transmits the generated MPD file to the electronic device 200. The streaming server 100 generates and caches a segment file in which different resolutions are assigned to the respective tiles of the tiled video, based on ROI information. That is, the streaming server 100 may store and manage segmented video tiles having different resolutions. The streaming server 100 transmits, to the electronic device 200, the cached segment file that contains the tiles of the tiled video having different resolutions. The MPD file may correspond to a manifest file that contains information about contents available for the electronic device 200, provided alternative bit rates, and URL address values. The ROI may be generated based on field of view (FOV) information of a user. The streaming server 100 may be implemented as a desktop, a laptop, a server computer, a cluster computer, or the like.

By parsing the MPD file, the electronic device 200 may acquire information about program timing, media-content availability, media type, image quality, minimum and maximum bandwidths, usable encoded-alternatives, DRM, and the like. The electronic device 200 may select an encoding scheme corresponding to a network state or the status of the electronic device and then perform a streaming request through an HTTP GET Request. For example, the electronic device 200 may establish a communication channel with the streaming server 100 in response to a user input. Through this, the electronic device 200 transmits the ROI information to the streaming server 200 and receives the segment file generated by using the ROI information. The electronic device 200 generates a single video by combining segmented video tiles of different resolutions contained in the received segment file, and outputs the generated video. Because high-resolution video tiles are located in ROIs and low-resolution video tiles are located in non-ROIs, the electronic device 200 can provide a high-quality VR content to the user in real time while reducing the load of data processing. The electronic device 200 may be implemented as a desktop, a laptop, a smart phone, a tablet PC, a handheld PC, an HMD, or the like, and preferably, the HMD.

The VR content streaming system 300 may be implemented based on a streaming protocol for transmission/reception of information between the streaming server 100 and the electronic device 200. The streaming protocol may use, but is not limited to, the HTTP 1.1 GET protocol.

Figure 2:
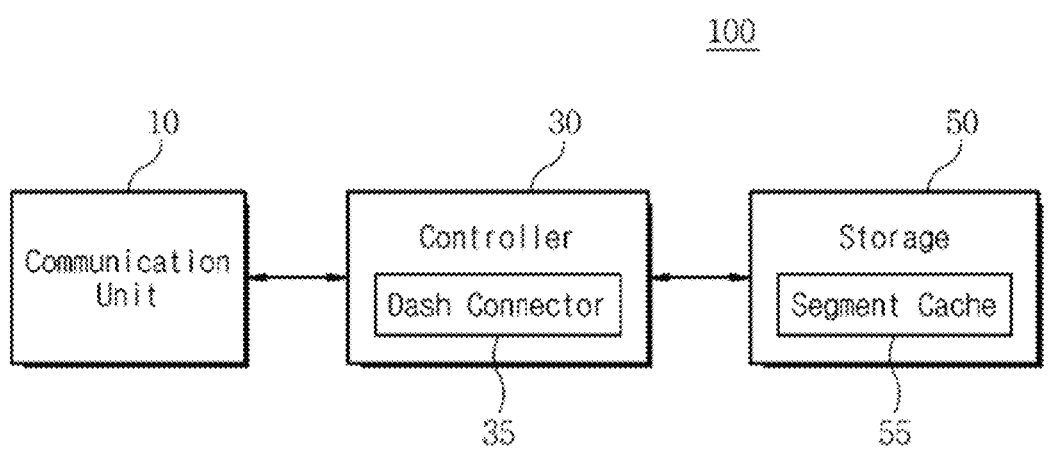
FIG. 2 is a block diagram illustrating a streaming server according to an embodiment of the present invention.
Figure 3:
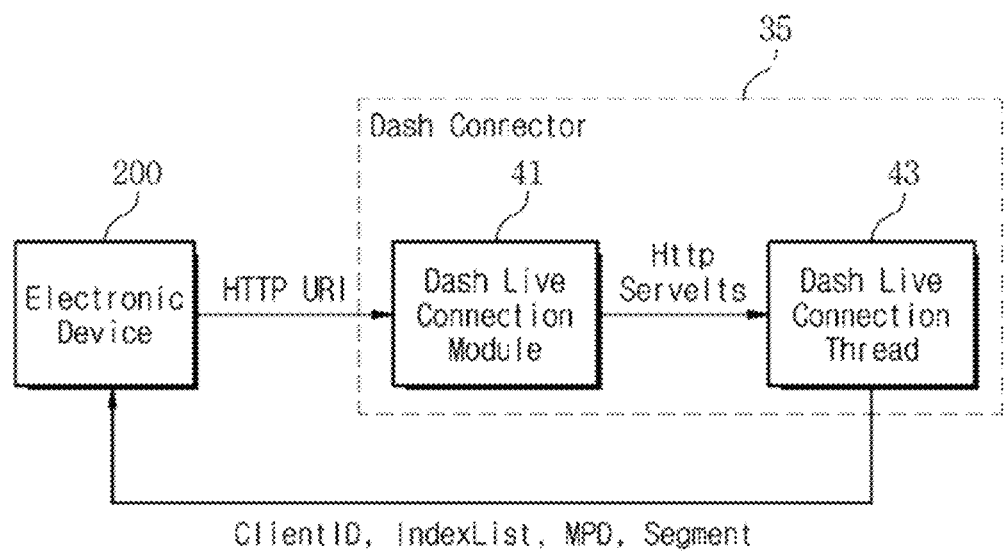
FIG. 3 is a diagram illustrating a dash connector shown in FIG. 2.
Figure 4:
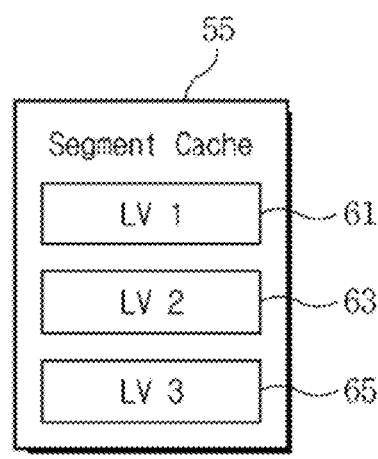
FIG. 4 is a diagram illustrating a segment cache shown in FIG. 2.

FIG. 2 is a block diagram illustrating a streaming server according to an embodiment of the present invention. FIG. 3 is a diagram illustrating a Dash connector shown in FIG. 2. FIG. 4 is a diagram illustrating a segment cache shown in FIG. 2.

Referring to FIGS. 1 to 4, the streaming server 100 may include a communication unit 10, a controller 30, and a storage 50.

The communication unit 10 communicates with the electronic device 200. The communication unit 10 may perform wired or wireless communication with the electronic device 200. The communication unit 10 receives a request signal for the MPD file regarding tiles of a tiled video, the ROI information, and a request signal for the segment file from the electronic device 200. The communication unit 10 transmits the MPD file and the segment file corresponding to the request signals to the electronic device 200.

When the request signal for the MPD file is received, the controller 30 controls the MPD file corresponding to the request signal to be transmitted to the electronic device 200. When the ROI information is received, the controller 30 generates and caches the segment file in which a first resolution and second to nth resolutions ('n' is a natural number of two or more), which are lower than the first resolution, are assigned to tiles of a tiled video, respectively, based on the ROI information. Through this, the controller 30 may assign different resolutions to the tiled video. When the request signal for the segment file is received, the controller 30 controls the cached segment file to be transmitted to the electronic device 200.

Specifically, the controller 30 may predict the next ROI information based on the ROI information and thereby generate the segment file in which the first to nth resolutions are assigned. That is, based on a base tile corresponding to the ROI information among a plurality of tiles, the controller 30 predicts a moving direction of an object contained in the base tile and thereby predicts the next ROI information. In addition, the controller 30 assigns the first resolution to a tile corresponding to the ROI among the plurality of tiles and also assigns the second to nth resolutions to the remaining tiles. Through this, the controller 30 may lower the system load. Also, the controller 30 generates and caches in advance the segment file to be transmitted to the electronic device 200, thereby minimizing a response delay time and enabling a real-time transmission of the segment file to the electronic device 200.

Particularly, in order to generate the segment file, the controller 30 may include a dynamic adaptive streaming over HTTP (Dash) connector 35. The Dash connector 35 includes a Dash live connection module 41 and a Dash live connection thread 43.

The Dash live connection module 41 performs a function of receiving an HTTP Connection from the electronic device 200. In addition, the Dash live connection module 41 performs functions of generating a DashConnectionThread when the HTTP Connection is established, and delivering and executing the HTTP Connection. The Dash live connection module 41 may receive the Connection in the same structure as that of the MultiThread Socket in the limit allowed by the system.

The Dash live connection thread 43, which is a thread related to HttpServletRequest and Response, parses a HTTP URI with a SubThread generated at the Dash live connection module 41 and performs a corresponding work. That is, in accordance with a URI message parsed by a thread's core method, the Dash live connection thread 43 determines whether to generate and transmit a ClientID, transmit an IndexList, transmit an MPD, and transmit a segment. The Dash live connection thread 43 generates a thread by checking the presence of a base tile, configures an adaptation set to be predicted by a user using the electronic device 200 based on the requested base tile, and requests caching.

The storage 50 stores various programs or various instructions necessary for operating the streaming server 100. For example, the storage 50 may store instructions related to the MPD file, the ROI information, and the segment file in connection with the tiles of the tiled video. The storage 50 stores the MPD file, the ROI information, and the segment file. In particular, the storage 50 may include a segment cache 55 for caching the segment file. The segment cache 55 is composed of three level caches 61, 63, and 65, and each cache manages a file loaded on memory in a first-in first-out (FIFO) scheme. The Lv1 cache 61 is a segment cache for predicted adaptation tile, the Lv2 cache 63 is a segment cache for a recently Dashed tile, and the Lv3 cache 65 is a segment cache for the least recently used (LRU) tile. The Lv1 cache 61, the Lv2 cache 63, and the Lv3 cache 65 do not have overlapped tiles. When there is a request for the segment file, the segment cache 55 performs a search in the order of the Lv1 cache 61, the Lv2 cache 63, and the Lv3 cache 65, and finally searches a file system if there is no cache. The segment cache 55 has a key/value map architecture and searches for a file name as a key. The segment cache 55 increases a requestCount corresponding to a retrieved and returned tile by one, and records a time stamp of the moment of return to use it as a factor for determining whether to move to the Lv3 cache 65 in case of deletion from the cache.

Whenever the Dash live connection thread 43 receives a request for a new center tile segment, the controller 30 caches surrounding tiles of the center tile into the Lv1 cache 61. This process is as shown in Equation 1.

$$M_{m \times n}(GoT)_{ij} \ni [a_{k,l}]_{i-1 \leq k \leq i+i, j-1 \leq l \leq j+1} - \{a_{ij}\} \quad \text{[Equation 1]}$$

$$\text{if } \begin{cases} k = m & (k \leq 0) \\ k = 1 & (k > m) \\ l = n & (l \leq 0) \\ l = 1 & (l > n) \end{cases}$$

In Equation 1, '$M_{m \times n}$' denotes indexes of tiles in the entire tile, 'GoT' (Grouping of Tiles) denotes a set of adjacent tiles, and 'k,l' denotes an index of an i, j array in adjacent tiles.

If a set of elements adjacent to $\{a_{2,2}\}$ is calculated from a $M_{4 \times 4}$ tiled video, $\{a_{1,1}, a_{1,2}, a_{1,3}, a_{2,1}, a_{2,3}, a_{3,2}, a_{3,3}\}$ are defined as adjacent tiles as shown in Equation 2, and such tiles are cached into the Lv1 cache 61.

$$\{a_{2,2}\}GoT \ni [a_{k,l}]_{1 \leq k \leq 3, 1 \leq l \leq 3} - \{a_{2,2}\} \text{ if,} \quad \text{[Equation 2]}$$

$$\begin{cases} k = 4 & (k \leq 0) \\ k = 1 & (k > 4) \\ l = 4 & (l \leq 0) \\ l = 1 & (l > 4) \end{cases}$$

$$\{a_{2,2}\}GoT \ni$$
$$\{a_{1,1}, a_{1,2}, a_{1,3}, a_{2,1}, a_{2,2}, a_{2,3}, a_{3,1}, a_{3,2}, a_{3,3}\} - \{a_{2,2}\}$$

The storage 50 may include at least one of a flash memory type storage, a hard disk type storage, a multimedia card micro type storage, a card type memory (e.g., SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, or an optical disk.

Figure 5:
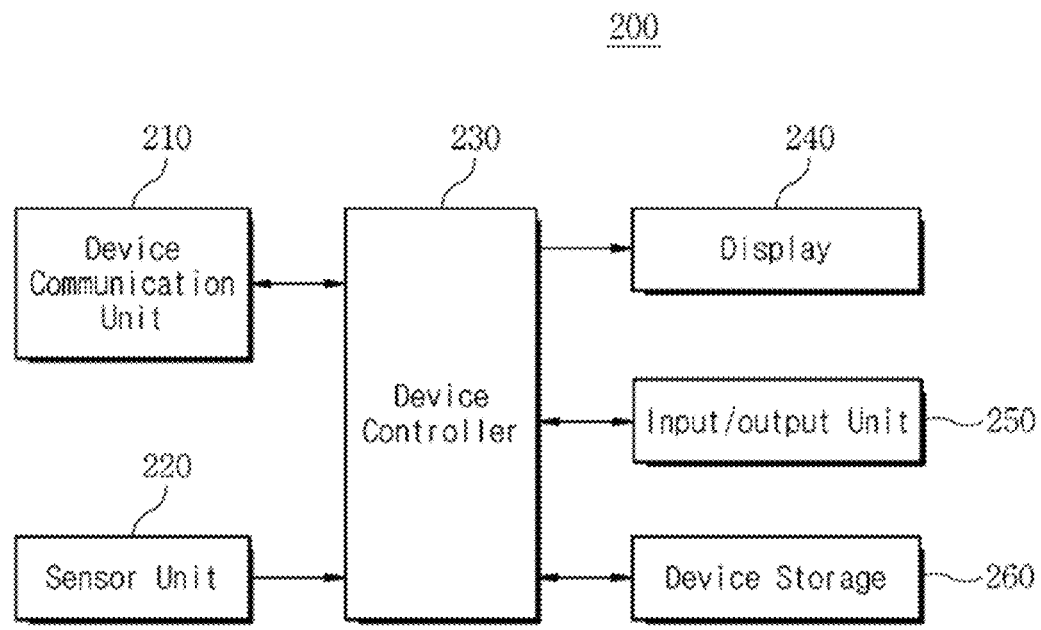
FIG. 5 is a block diagram illustrating an electronic device according to an embodiment of the present invention.

FIG. 5 is a block diagram illustrating an electronic device according to an embodiment of the present invention.

Referring to FIGS. 1 and 5, the electronic device 200 includes a device communication unit 210, a sensor unit 220, a device controller 230, a display 240, an input/output unit 250, and a device storage 260.

The device communication unit 210 communicates with the streaming server 100. The device communication unit 210 may perform wired or wireless communication with the streaming server 100. The device communication unit 210 transmits a request signal for the MPD file, the ROI information, and a request signal for the segment file to the streaming server 100. The device communication unit 210 receives the MPD file and the segment file corresponding to the request signals from the streaming server 100.

The sensor unit 220 tracks user's eyes and collects tracking information. The sensor unit 220 transmits information about a direction indicated by a user's pupil to the device controller 230 as viewpoint information. When the electronic device 200 is the HMD, the sensor unit 220 is installed in the HMD and may be activated, when the user wears the HMD, to detect a change in the position of the user's pupil. When the electronic device 200 is not the HMD, the sensor unit 220 is implemented as a separate sensor module and may be activated, when the user enters a user input, to detect a change in the position of the user's pupil.

The device controller 230 controls the request signal for requesting the MPD file to be transmitted to the streaming server 100. When the MPD file corresponding to the request signal is received, the device controller 230 controls the MPD file to be outputted through the display 240. At this time, the sensor unit 220 may collect viewpoint information of the user who watches a displayed image. The device controller 230 generates the ROI information by using the viewpoint information collected by the sensor unit 220 and controls the generated ROI information to be transmitted to the streaming server 100.

When receiving the segment file for the tiles of the tiled video having different resolutions from the streaming server 100, the device controller 230 performs the multi-resolution shading (MRS) rendering of the tiles of the tiled video to generate VR content, and controls the display 240 to output the generated VR content. In particular, the VR content has high-resolution tiles in the ROIs and low-resolution tiles in the non-ROIs, thereby reducing the overall data load and enabling a low-latency live streaming service. Additionally, when further receiving audio information, the device controller 230 may render the received audio information together with the tiles of the tiled video.

The display 240 outputs a screen related to the operation of the electronic device 200. For example, the display 240 may output a screen associated with access to the streaming server 100, a screen associated with the MPD file provided by the streaming server 100, and the VR content generated by the segment file provided by the streaming server 100. When the electronic device 200 is the HMD, the display 240 may include separated display areas included in the HMD to output the VR video. The separated display areas may output a left-eye image and a right-eye image, respectively. The display 240 may include at least one of a liquid crystal display (LCD), a thin film transistor-liquid crystal display (TFT-LCD), an organic light emitting diode (OLED), a flexible display, or a three-dimensional (3D) display.

The input/output unit 250 may include at least one input device for entering a user input related to a manipulation of the electronic device 200, such as one or more buttons, a touch pad, a touch screen, and a voice input microphone. The input/output unit 250 may include an audio device capable of outputting an audio signal related to the operation of the electronic device 200, a lamp capable of outputting light, or a vibrating element. For example, the input/output unit 250 may output audio signals received from the streaming server 100 to be synchronized with the tiles of the tiled video.

The device storage 260 stores programs and instructions related to the operation of the electronic device 200. That is, the device storage 260 may store an application program associated with the operation of the electronic device 200. The device storage 260 may store the MPD file and the segment file received from the streaming server 100, and store the VR content generated based on the ROI. The device storage 260 may include at least one of a flash memory type storage, a hard disk type storage, a multimedia card micro type storage, a card type memory (e.g., SD or XD memory), a RAM, an SRAM, a ROM, an EEPROM, a PROM, a magnetic memory, a magnetic disk, or an optical disk.

Figure 6:
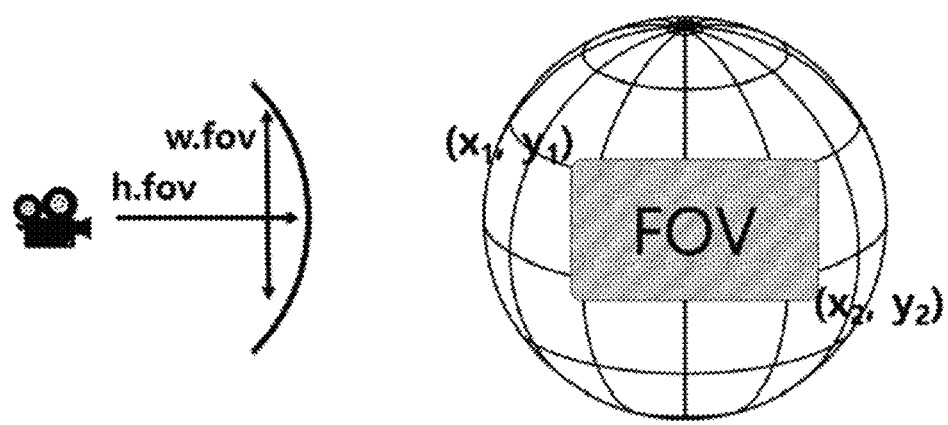
FIG. 6 is a diagram illustrating an ROI detection according to an embodiment of the present invention.
Figure 7:
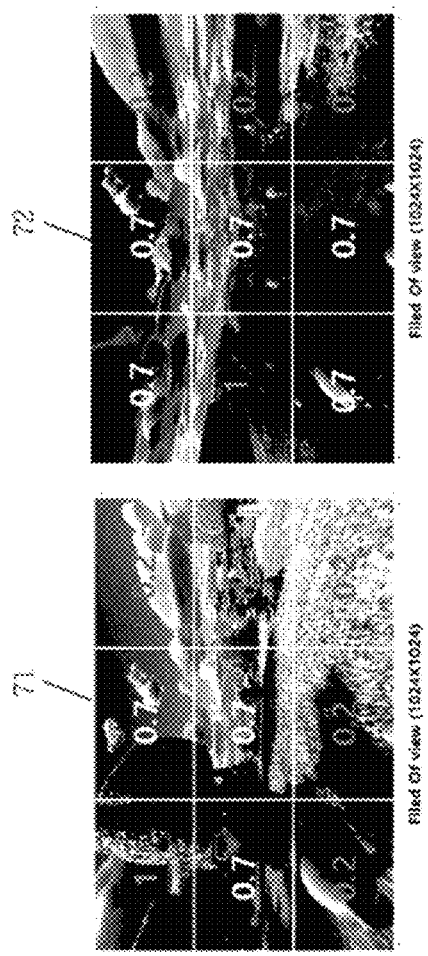
FIG. 7 is a diagram illustrating a texture of a tiled video according to an embodiment of the present invention.
Figure 8:
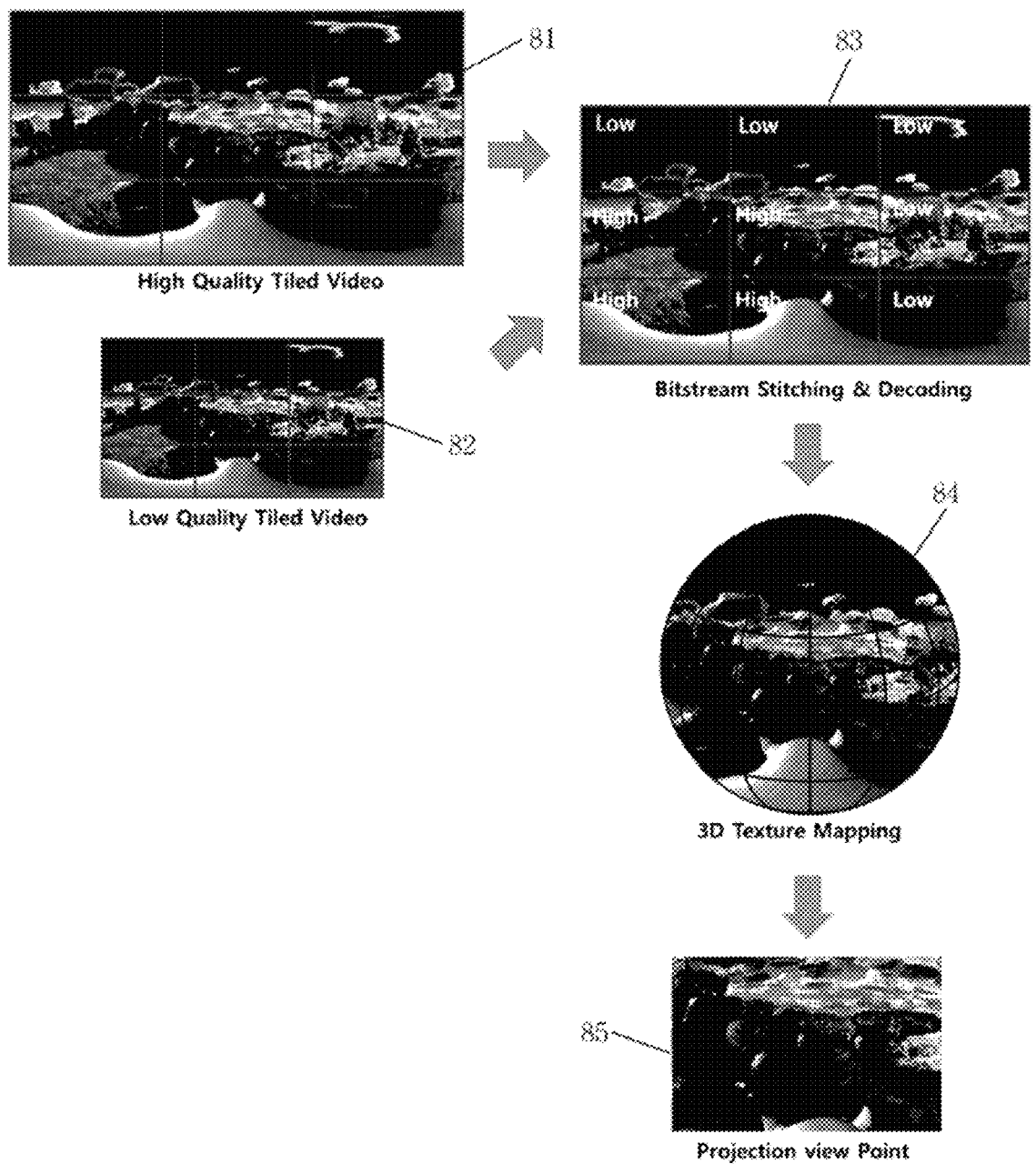
FIG. 8 is a diagram illustrating a 360-degree VR video modeling according to an embodiment of the present invention.
Figure 9:
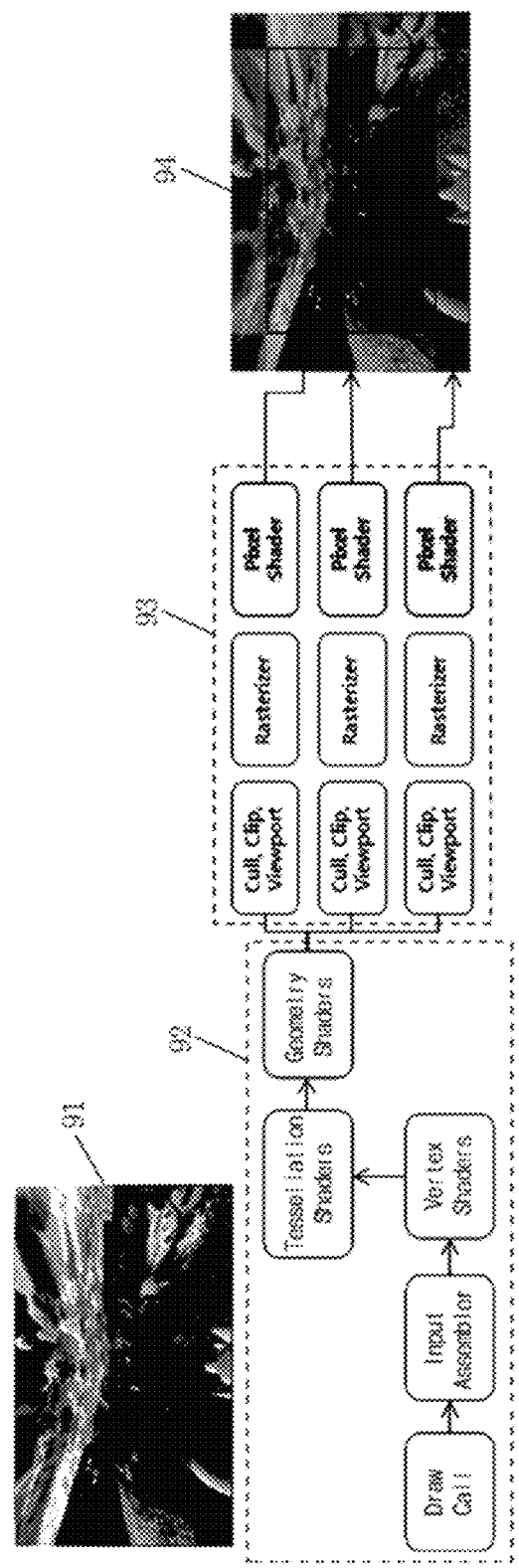
FIG. 9 is a diagram illustrating a tiled video rendering according to an embodiment of the present invention.

FIG. 6 is a diagram illustrating an ROI detection according to an embodiment of the present invention. FIG. 7 is a diagram illustrating a texture of a tiled video according to an embodiment of the present invention. FIG. 8 is a diagram illustrating a 360-degree VR video modeling according to an embodiment of the present invention. FIG. 9 is a diagram illustrating a tiled video rendering according to an embodiment of the present invention.

Referring to FIGS. 6 to 9, the electronic device 200 generates an ROI-based VR content and outputs the generated VR content.

To this end, the electronic device 200 defines an ROI in the entire texture. The electronic device 200 defines a field of view (FOV) to use high-quality tiles by using position tracking (see FIG. 6). The electronic device 200 may receive position tracking values as x, y, and z vector values, and the received vector values are normalized as shown in Equation 3.

$$\text{res} = \sqrt{x^2 + y^2 + z^2} \quad \text{[Equation 3]}$$

if(res≠0|res≠1)x=y=z=1.0−res

Here, 'res' means a vector length between x, y, and z.

The electronic device 200 calculates FOV coordinates, based on the normalized position tracking coordinates. Coordinates x1 and x2 are calculated as shown in Equation 4, and coordinates y1 and y2 are calculated as shown in Equation 5.

$$\theta = \operatorname{atan}(z, x) - \frac{\pi}{2} \quad \text{[Equation 4]}$$

$$h \cdot fov = \frac{\text{camera} \cdot fov \times \text{camera} \cdot \text{width}}{\text{camera} \cdot \text{height}} \div 2$$

$$x_1 = 1 - (\theta - h \cdot fov + \pi) \div \frac{\pi}{2} \times \text{width}$$

$$x_2 = 1 - (\theta + h \cdot fov + \pi) \div \frac{\pi}{2} \times \text{width}$$

$$\theta = \operatorname{atan}(z, y) \quad \text{[Equation 5]}$$

$$w \cdot fov = \text{camera} \cdot fov \div 2$$

$$y_1 = (\theta - w \cdot fov) \div \pi \times \text{height}$$

$$y_2 = (\theta + w \cdot fov) \div \pi \times \text{height}$$

Here, 'h.fov' means the FOV with respect to height, and 'w.fov' means the FOV with respect to width.

The electronic device 200 defines the ROI in the FOV by using viewpoint tracking coordinates (x, y, z) in the FOV, based on the position tracking. Using Equation 6, the electronic device 200 calculates position coordinates in the FOV from the viewpoint tracking coordinates (x,y,z=1).

$$EyeX = \frac{x \times \text{width}}{2} + \frac{\text{width}}{2} \quad \text{[Equation 6]}$$

$$EyeY = \frac{y \times \text{height}}{2} + \frac{\text{height}}{2}$$

Using the defined ROI, the electronic device 200 may divide a viewport area of the rendered texture 71 or 72 into a high resolution (1.0), a medium resolution (0.7), and a low resolution (0.2). That is, the electronic device 200 may generate a multi-resolution texture by assigning the high resolution (1.0) to a tile located in the ROI, the medium resolution (0.7) to surrounding tiles, and the low resolution (0.2) to the other tiles, and also quantify 73 such resolutions for the respective tiles.

Specifically, the electronic device 200 basically supports the MPEG-DASH standard and detects the ROI by using eye-view tracking coordinates. For example, tiles represented by x and y coordinate values of a video tiled into 6×6 with a resolution of 7680×3840 may be calculated as shown in Equation 7.

$$\text{row} = \begin{cases} 6 & \text{if } (y = 3840) \\ \left[1 \le \frac{y}{640} + < 7\right] & \text{if } (0 \le y < 3840) \end{cases} \quad \text{[Equation 7]}$$

$$\text{col} = \begin{cases} 6 & \text{if } (x = 7680) \\ \left[1 \le \frac{x}{1280} + 1 < 7\right] & \text{if } (0 \le x < 7680) \end{cases}$$

If the x coordinate is 4100 and the y coordinate is 2000, a tile including this coordinate value is (3+1, 3+1), which is $$\left(\left[\frac{4100}{1280} + 1\right], \left[\frac{2000}{640} + 1\right]\right),$$

and finally represented as (4, 4) when expressed as an integer except a decimal point.

The electronic device 200 may configure a tile corresponding to the ROI with a high resolution 81 and also configure a tile corresponding to the non-ROI with a medium or low resolution 82. At this time, the electronic device 200 requests and receives the segment file for tiles having different resolutions based on the ROI from the streaming server 100. Meanwhile, if there is no pre-stored MPD file, the electronic device 200 first receives the MPD file from the streaming server 100 before ROI detection.

After receiving the segment file, the electronic device 200 performs bitstream stitching and decoding 83. Thereafter, the electronic device 200 maps the decoded video image to a 3D texture 84 for rendering, and selects a projection view point 85.

The electronic device 200 creates and displays a multi-view port projection texture from a single projection texture 91 of the selected projection view point video image by using multi-resolution rendering. The multi-resolution rendering may include a graphics pipeline 92 and three multi-view port outputs 93.

Figure 10:
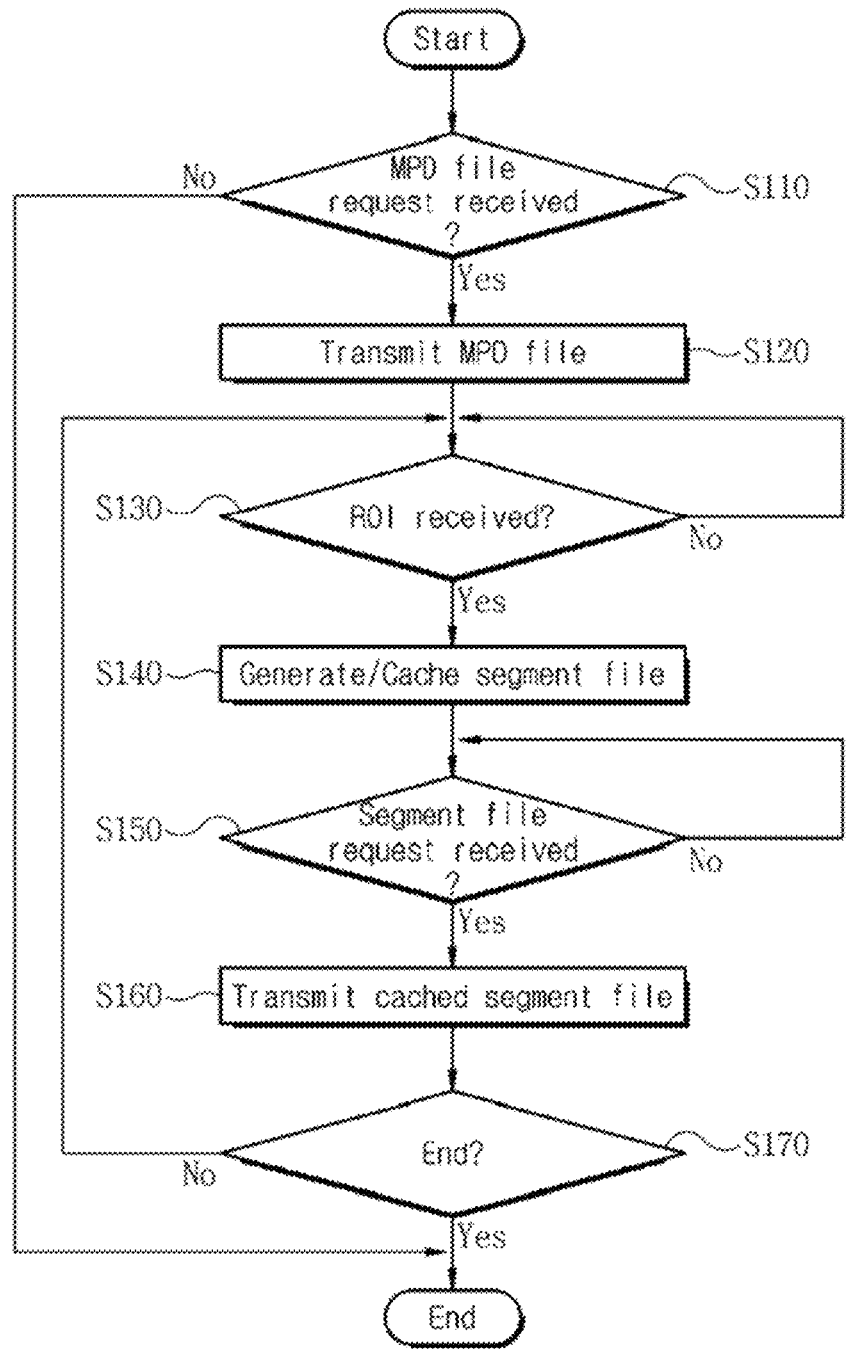
FIG. 10 is a flow diagram illustrating a VR content streaming method of a streaming server according to an embodiment of the present invention.

FIG. 10 is a flow diagram illustrating a VR content streaming method of a streaming server according to an embodiment of the present invention.

Referring to FIGS. 1 and 10, the VR content streaming method caches in advance high-quality and low-quality tiles to be transmitted, by using ROI information of a user, and transmits the cached tiles in response to a transmission request.

At step S110, the streaming server 100 determines whether a request signal for an MPD file is received. When the MPD file request signal is received from the electronic device 200, the streaming server 100 performs step S120. If the MPD file request signal is not received, the streaming server 100 terminates a process.

At step S120, the streaming server 100 transmits the MPD file to the electronic device 200. That is, the streaming server 100 transmits the MPD file corresponding to the request signal to the electronic device 200.

At step S130, the streaming server 100 determines whether ROI information is received. When the ROI information is received from the electronic device 200, the streaming server 100 performs step S140. If the ROI information is not received, the streaming server 100 performs step S130 again.

At step S140, the streaming server 100 generates and caches a segment file. Specifically, the streaming server 100 generates the segment file in which a first resolution and second to nth resolutions, which are lower than the first resolution, are assigned to tiles of a tiled video, respectively, based on the ROI information. That is, the streaming server 100 assigns the first resolution to a tile corresponding to the ROI among the tiles and assigns the second to nth resolutions to the remaining tiles. The streaming server 100 caches the generated segment file.

At step S150, the streaming server 100 determines whether a request signal for the segment file is received. When the segment file request signal is received from the electronic device 200, the streaming server 100 performs step S160. If the segment file request signal is not received, the streaming server 100) performs step S150 again.

At step S160, the streaming server 100 transmits the cached segment file to the electronic device 200. That is, the streaming server 100 transmits the segment file corresponding to the request signal to the electronic device 200.

At step S170, the streaming server 100 determines whether to terminate the process. Unless terminating the process, the streaming server 100 returns to step S130.

As described hereinbefore, the streaming server 100 generates in advance the segment file to be transmitted by predicting the next ROT information even if a request for the segment file is not received from the electronic device 200. Therefore, the streaming server 100 can provide live streaming to the user with a reduced system load and a minimized response delay time.

While the present invention has been particularly shown and described with reference to some embodiments thereof, it will be understood by those skilled in the art that various changes in form and details may be made therein without departing from the scope of the present invention as defined by the appended claims.

What is claimed is:

1. A region of interest (ROI)-based virtual reality (VR) content streaming server comprising:
   a communication unit configured to receive a first request signal for a media presentation description (MPD) file regarding tiles of a tiled video, ROI information, and a second request signal for a segment file from an electronic device, and to transmit the MPD file and the segment file corresponding to the first request signal and the second request signal to the electronic device;
   a storage device comprising a first segment cache for a predicted adaptation tile, a second segment cache for a recently dashed tile, and a third segment cache for a least recently used (LRU) tile; and
   a controller configured to:
      in response to receiving the first request signal for the MPD file, control the MPD file corresponding to the first request signal to be transmitted to the electronic device,
      in response to receiving the ROI information, generate and cache the segment file in which first to nth resolutions ('n' is a natural number of 2 or greater) are assigned to the tiles of the tiled video, respectively, based on the ROI information, the first resolution being highest among the n resolutions, and
      in response to receiving the second request signal for the segment file, control the cached segment file to be transmitted to the electronic device,
   wherein the controller is configured to search caches in the order of the first segment cache, the second segment cache, and the third segment cache in response to the second request signal.

2. The server of claim 1, wherein the controller is further configured to predict next ROI information based on the ROI information so as to generate the segment file in which the first to nth resolutions are assigned.

3. The server of claim 2, wherein the controller is further configured to, based on a base tile corresponding to the ROI information among the tiles, predict a moving direction of an object contained in the base tile so as to predict the next ROI information.

4. The server of claim 1, wherein the controller is further configured to assign the first resolution to a first tile among the tiles, the first tile corresponding to the ROI information, the controller being configured to assign the second to nth resolutions to the remaining tiles.

5. The server of claim 1, wherein the controller is further configured to control the cached segment file to be transmitted in real time.

6. A region of interest (ROI)-based virtual reality (VR) content streaming method comprising:
   at a streaming server, in response to receiving a first request signal for a media presentation description (MPD) file regarding tiles of a tiled video from an electronic device, transmitting the MPD file corresponding to the first request signal to the electronic device;

at the streaming server, in response to receiving ROI information from the electronic device, generating and caching a segment file in which first to nth resolutions ('n' is a natural number of 2 or greater) are assigned to the tiles of the tiled video, respectively, based on the ROI information, the first resolution being highest among the n resolutions; and at the streaming server, in response to receiving a second request signal for the segment file from the electronic device, transmitting the cached segment file to the electronic device, wherein the transmitting the cached segment file includes searching caches in the order of a first segment cache for a predicted adaptation tile, a second segment cache for a recently dashed tile, and a third segment cache for a least recently used (LRU) tile.

7. The method of claim 6, wherein the caching includes predicting next ROI information based on the ROI information so as to generate the segment file in which the first to nth resolutions are assigned.

8. The method of claim 7, wherein the caching includes, based on a base tile corresponding to the ROI information among the tiles, predicting a moving direction of an object contained in the base tile so as to predict the next ROI information.

9. The method of claim 6, wherein the caching includes assigning the first resolution to a first tile among the tiles, the first tile corresponding to the ROI information among the tiles and assigning the second to nth resolutions to the remaining tiles.

10. The method of claim 6, wherein the cached segment file is transmitted in real time.

\* \* \* \* \*

UNITED STATES PATENT AND TRADEMARK OFFICE
CERTIFICATE OF CORRECTION

PATENT NO. : 11,025,880 B2
APPLICATION NO. : 16/713797
DATED : June 1, 2021
INVENTOR(S) : Jang et al.

It is certified that error appears in the above-identified patent and that said Letters Patent is hereby corrected as shown below:

On the Title Page

Item (57), ABSTRACT, Line 5, delete "ROI)" and insert -- ROI --.

In the Drawings

In sheet 2 of 7, FIG. 3, Line 5 approx., delete "Servelts" and insert -- Servlets --.

In the Specification

In Column 1, Line 52, delete "ROT." and insert -- ROI. --.

In Column 2, Line 42, delete "ROT" and insert -- ROI --.

In Column 2, Line 51, delete "ROT" and insert -- ROI --.

In Column 5, Lines 53 approx., delete "$M_{m \times n}(GoT)_{ij} \ni [\alpha_{k,l}]_{i-1 \leq k \leq i+i, j-1 \leq l \leq j+1} - \{\alpha_{ij}\}$," and insert -- $M_{m \times n}(GoT)_{ij} \ni [\alpha_{k,l}]_{i-1 \leq k \leq i+1, j-1 \leq l \leq j+1} - \{\alpha_{i,j}\}$ --.

In Column 5, Line 65, delete "$a_{2,3}$," and insert -- $a_{2,3}$, $a_{3,1}$, --.

In Column 8, Lines 50-53, delete "  " and insert

Signed and Sealed this
Fifth Day of October, 2021

Drew Hirshfeld
*Performing the Functions and Duties of the*
*Under Secretary of Commerce for Intellectual Property and*
*Director of the United States Patent and Trademark Office*

$$row = \left\{ \begin{matrix} 6 \\ \left[ 1 \leq \frac{y}{640} + 1 < 7 \right] \end{matrix} \right.$$

In Column 9, Line 60, delete "100)" and insert -- 100 --.

In Column 10, Line 3, delete "ROT" and insert -- ROI --.